US012321917B2

(12) United States Patent
Wied et al.

(10) Patent No.: US 12,321,917 B2
(45) Date of Patent: Jun. 3, 2025

(54) SYSTEMS AND METHODS FOR EXECUTING REAL-TIME ELECTRONIC TRANSACTIONS USING GRAPHICAL USER INTERFACE

(71) Applicant: Worldpay, LLC, Symmes Township, OH (US)

(72) Inventors: William J. Wied, Austin, TX (US); Manuela Dragan, Westfield, NJ (US); Stephen E. Dinan, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 17/446,207

(22) Filed: Aug. 27, 2021

(65) Prior Publication Data

US 2023/0069798 A1    Mar. 2, 2023

(51) Int. Cl.
  *G06Q 20/22*    (2012.01)
  *G06Q 20/06*    (2012.01)
  *G06Q 20/10*    (2012.01)

(52) U.S. Cl.
  CPC ......... *G06Q 20/227* (2013.01); *G06Q 20/065* (2013.01); *G06Q 20/108* (2013.01)

(58) Field of Classification Search
  CPC ... G06Q 20/227; G06Q 20/065; G06Q 20/108
  See application file for complete search history.

(56) References Cited

U.S. PATENT DOCUMENTS 8,010,424 B1    8/2011  Hamilton et al.
11,551,190 B1 *  1/2023  Clements ............... G06Q 20/20
(Continued)

FOREIGN PATENT DOCUMENTS

CA    2435909 A1    8/2002
CA    2734914 A1    9/2011
(Continued)

OTHER PUBLICATIONS

Written Opinion of the ISA (Year: 2023).*
(Continued)

*Primary Examiner* — Scott C Anderson
*Assistant Examiner* — James H Miller
(74) *Attorney, Agent, or Firm* — Bookoff McAndrews, PLLC

(57) ABSTRACT

Systems and methods of executing a real-time electronic transaction by a UI platform are disclosed. One method includes receiving an input selection by a user to indicate an originating account, receiving account, and payment amount. The system may transmit an option for the user to carry out the transaction by using a default payment setting, and upon the user selecting this option, determining the default payment setting, payment time or date, and a transaction cost, and displaying these to user. Alternatively, the system may transmit an option for the user to carry out the electronic transaction by the user defining the payment setting, and upon selection of this choice, performing payment optimization logic to display available payment settings, receiving a selection from the user of the chosen payment setting, and displaying the payment setting including the originating account, receiving account, payment amount, delivery time or date, and transaction cost.

20 Claims, 10 Drawing Sheets

(56) References Cited

U.S. PATENT DOCUMENTS

| | | | |
|---|---|---|---|
| 2003/0055783 A1* | 3/2003 | Cataline | G06Q 20/10 |
| | | | 705/40 |
| 2004/0128240 A1 | 7/2004 | Yusin | |
| 2004/0148252 A1* | 7/2004 | Fleishman | G06Q 20/223 |
| | | | 705/39 |
| 2006/0015452 A1* | 1/2006 | Kulasooriya | G06Q 30/06 |
| | | | 705/39 |
| 2007/0005498 A1* | 1/2007 | Cataline | G06Q 40/02 |
| | | | 705/42 |
| 2007/0162387 A1 | 7/2007 | Cataline et al. | |
| 2008/0082454 A1 | 4/2008 | Dilip et al. | |
| 2010/0030687 A1 | 2/2010 | Panthaki et al. | |
| 2010/0042537 A1* | 2/2010 | Smith | G06Q 20/02 |
| | | | 705/40 |
| 2010/0114764 A1 | 5/2010 | Cataline et al. | |
| 2011/0246358 A1 | 10/2011 | Blackhurst et al. | |
| 2013/0103577 A1* | 4/2013 | Lawson | G06Q 20/405 |
| | | | 705/39 |
| 2013/0138557 A1 | 5/2013 | Mullen et al. | |
| 2013/0311266 A1 | 11/2013 | Vichich et al. | |
| 2014/0172695 A1* | 6/2014 | Kanjlia | G07G 1/009 |
| | | | 705/39 |
| 2015/0112866 A1* | 4/2015 | Muthu | G06Q 20/385 |
| | | | 705/44 |
| 2015/0262183 A1* | 9/2015 | Gervais | G06Q 20/405 |
| | | | 705/44 |
| 2015/0278887 A1* | 10/2015 | Almond | G06Q 30/0283 |
| | | | 705/40 |
| 2016/0086150 A1* | 3/2016 | Gomi | G06Q 20/102 |
| | | | 705/39 |
| 2016/0104133 A1* | 4/2016 | Davis | G06Q 20/10 |
| | | | 705/39 |
| 2016/0180304 A1* | 6/2016 | Carriles | G06Q 20/401 |
| | | | 705/44 |
| 2016/0300197 A1* | 10/2016 | Guido | G06F 3/04842 |
| 2017/0193485 A1* | 7/2017 | Wu | G06Q 30/0226 |
| 2017/0195993 A1 | 7/2017 | Cole et al. | |
| 2017/0278085 A1* | 9/2017 | Anderson | G06Q 20/12 |
| 2018/0056179 A1 | 3/2018 | Rose et al. | |
| 2018/0197177 A1* | 7/2018 | Lee | G06Q 30/0641 |
| 2018/0225648 A1* | 8/2018 | Robinson | G06Q 20/24 |
| 2018/0240081 A1* | 8/2018 | Doyle | G06Q 20/02 |
| 2019/0378098 A1* | 12/2019 | Lam | G06Q 20/027 |
| 2020/0034813 A1* | 1/2020 | Calinog | G06Q 20/065 |
| 2020/0074416 A1* | 3/2020 | Mathew | G06Q 20/24 |
| 2021/0004833 A1 | 1/2021 | Adibi et al. | |
| 2021/0042712 A1 | 2/2021 | Crowley et al. | |
| 2021/0049577 A9* | 2/2021 | Wilson | G06Q 20/326 |
| 2021/0201302 A1 | 7/2021 | Honigberg et al. | |
| 2021/0217012 A1 | 7/2021 | Kettler et al. | |
| 2021/0295293 A1* | 9/2021 | Delson | H04L 45/12 |
| 2021/0390544 A1 | 12/2021 | Terrell et al. | |
| 2021/0398100 A1 | 12/2021 | Gabriele et al. | |
| 2022/0215392 A1* | 7/2022 | Wied | G06F 9/547 |
| 2022/0245632 A1* | 8/2022 | Nicholson | G06Q 20/40 |
| 2022/0300917 A1* | 9/2022 | Wied | G06Q 20/027 |
| 2022/0414624 A1* | 12/2022 | Carroll | G06Q 20/10 |

FOREIGN PATENT DOCUMENTS

| | | | | |
|---|---|---|---|---|
| CA | 3046235 A1 | | 12/2019 | |
| WO | WO-0237386 A1 | * | 5/2002 | G06Q 20/00 |
| WO | WO-02065243 A2 | * | 8/2002 | G06Q 20/10 |
| WO | 02059847 A1 | | 9/2002 | |
| WO | WO-2008009052 A1 | * | 1/2008 | G06Q 40/00 |
| WO | 2009118584 A1 | | 10/2009 | |
| WO | WO-2016057035 A1 | * | 4/2016 | G06Q 20/10 |

OTHER PUBLICATIONS

Interbank Transfers—Balance Build—Transfer & Account Management (Year: 2016).*
Web Pay—Payments Flowcharts and Wireframes (Year: 2016).*
IBM Financial Transaction Manager for Automated Clearing House Services (Year: 2015).*
Federated Optimization for Financial Transaction Management (Year: 2019).*
ISO 8583-1987 Data Element Definitions (Year: 1998).*
Pay-Per-View Payment System and Method (Year: 2005).*
Automatically Calculate Periodic Payment Information (U.S. Appl. No. 09/584,611, filed May 31, 2000) (Year: 2000).*
International Search Report issued in International Application No. PCT/US2022/041694 dated Dec. 12, 2022 (12 pages).
Electronic FUnda Transfer Act (EFTA) (Year: 2019).
ISO 8583-1987, Section 4, Data Element Definitions (Year: 1987).
AI vs ML—What's the Difference Between Artificial Intelligence and Machine Learning? (Year: 2021).
Federated Optimization for Financial Transaction Management, IP.com No. IPCOM000257024D (Year: 2019).

* cited by examiner

SYSTEMS AND METHODS FOR EXECUTING REAL-TIME ELECTRONIC TRANSACTIONS USING GRAPHICAL USER INTERFACE

TECHNICAL FIELD

The present disclosure relates generally to the field of electronic transactions and, more particularly, to systems and methods for executing real-time electronic transactions across multiple networks using a single platform.

BACKGROUND

Businesses, merchants, consumers, financial entities, and/or government entities may perform electronic fund transfers, payment processing (e.g., e-commerce payments), capital management, etc. domestically and internationally over various payment networks. However, many aspects of the existing electronic payment/fund transaction technology involve some inherent deficiencies or shortcomings that may lead to poor user experience, increased time and costs, and other inconveniences when sending payments electronically across various payment networks. For example, many legacy payment processing networks involve a patchwork of processing systems, fragmented systems, security risks, and the like. The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for a user to initiate a payment from an originating account to a receiving account, the method comprising: receiving an input selection by the user to indicate an originating account, the originating account being an account from which the payment is to originate; receiving an input selection by the user to indicate a receiving account, the receiving account being an account that is to receive the payment; receiving an input selection by the user as to the amount of the payment; transmitting an indicia for the payment to be carried out using a default payment setting and an indicia for the payment to be carried out using a user defined payment setting; receiving an input selection by the user to indicate that the payment is to be carried out using a default payment setting, or alternatively, receiving an input selection by the user to indicate that the payment is to be carried out using a user defined payment setting, displaying payment setting options, and receiving an input selection by the user indicating a chosen payment setting; and displaying information including the originating account, receiving account, and the payment setting.

One embodiment provides a real-time transaction system comprising: one or more computer readable media storing instructions for executing a real-time electronic transaction; and one or more processors configured to execute the instructions to perform operations comprising: receiving an input selection by the user to indicate an originating account, the originating account being an account from which the payment is to originate; receiving an input selection by the user to indicate a receiving account, the receiving account being an account that is to receive the payment; receiving an input selection by the user as to the amount of the payment; transmitting an indicia for the payment to be carried out using a default payment setting and an indicia for the payment to be carried out using a user defined payment setting; receiving an input selection by the user to indicate that the payment is to be carried out using a default payment setting, or alternatively, receiving an input selection by the user to indicate that the payment is to be carried out using a user defined payment setting, displaying payment setting options, and receiving an input selection by the user indicating a chosen payment setting; and displaying information including the originating account, receiving account, and the payment settings.

One embodiment provides a non-transitory computer-readable medium storing instructions for executing a real-time transaction, the instructions, when executed by one or more processors, causing the one or more processors to perform operations comprising: receiving an input selection by the user to indicate an originating account, the originating account being an account from which the payment is to originate; receiving an input selection by the user to indicate a receiving account, the receiving account being an account that is to receive the payment; receiving an input selection by the user as to the amount of the payment; transmitting an indicia for the payment to be carried out using a default payment setting and an indicia for the payment to be carried out using a user defined payment setting; receiving an input selection by the user to indicate that the payment is to be carried out using a default payment setting, or alternatively, receiving an input selection by the user to indicate that the payment is to be carried out using a user defined payment setting, displaying payment setting options, and receiving an input selection by the user indicating a chosen payment setting; and displaying information including the originating account, receiving account, and the payment settings.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
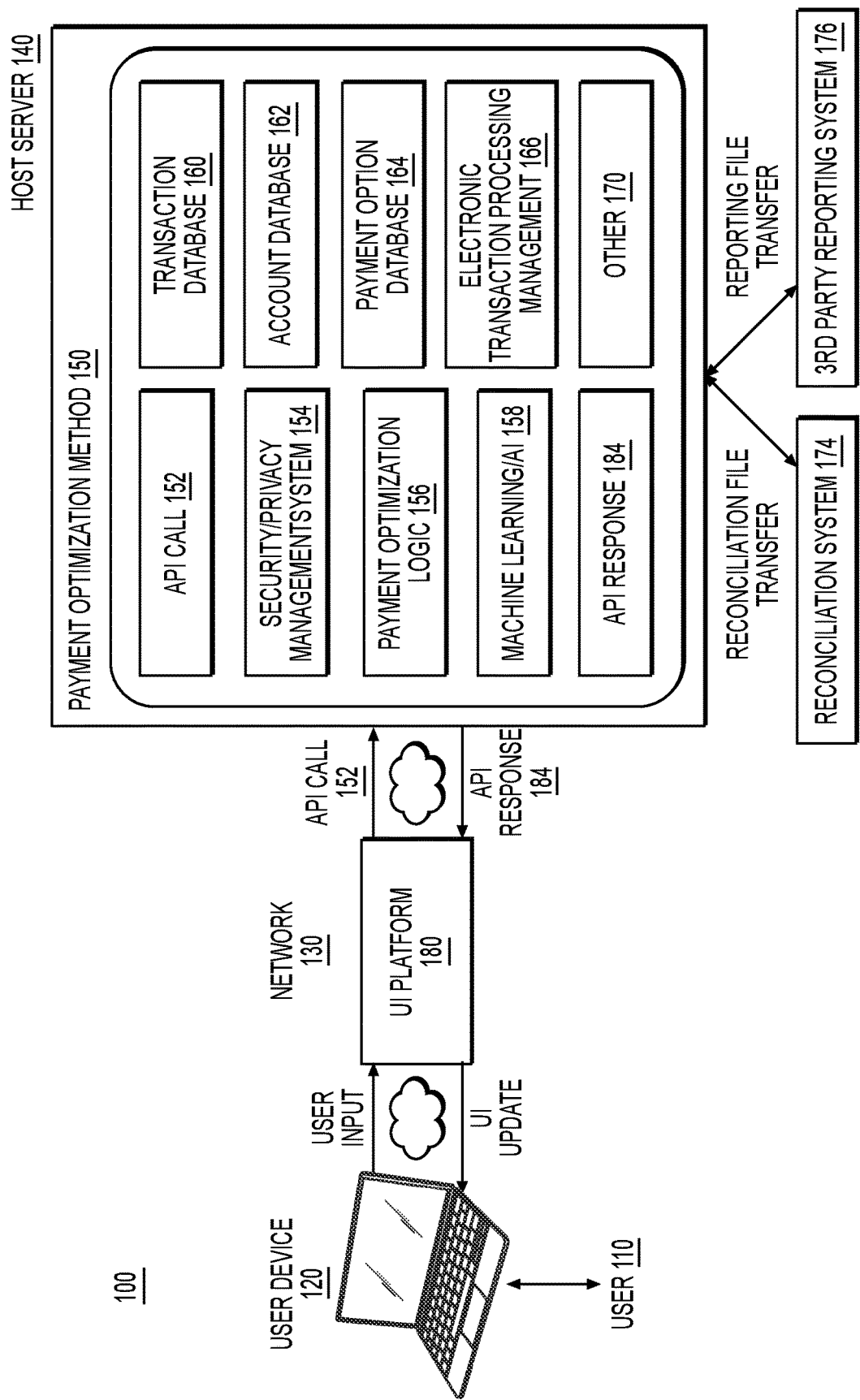
FIG. 1 depicts a block diagram of an exemplary environment for the electronic transaction system, according to one aspect of the present disclosure.

The following embodiments describe systems and methods for facilitating electronic transactions. More particularly, the embodiments contemplated in the present disclosure may enable merchants, customers, businesses, institutions, etc. to utilize a single user interface to initiate, store, and execute electronic command files to complete various electronic transactions.

As discussed above, various aspects of the existing electronic payment technology involve certain drawbacks and deficiencies in executing payment transactions domestically and/or internationally. For example, the patchwork of complex legacy systems and evolving solutions, the maze of compliance standards across various markets and payment methods, and arbitrary transaction pricing strategies may lead to slow and unreliable transactions as well as increased costs and poor user experience.

To address the above-noted problems, the present disclosure describes systems and methods that provide a unified platform that facilitates or provides, for example: 1) a singular user interface (UI) platform for all account-to-account payment methods used by a user; 2) managing consistent and globally accepted security and privacy practices; 3) intelligent payment routing and orchestration display; 4) unified reconciliation and reporting across payment methods and schemes; and 5) a single management portal which may provide management of an entire customer lifecycle. For example, a payment optimization method including a security/privacy management system, payment optimization logic, and other related databases or systems may create the necessary file instructions to facilitate and execute electronic transactions of the present disclosure.

At a high level, one exemplary embodiment includes a user interacting with a user device to initiate a funds transfer by interacting with a UI platform. An API call is generated and transferred to a host server. The host server includes numerous databases, programming logic, management systems and other processes and uses these to produce instructions for updating the UI platform. These instructions in an API response will update the UI platform providing the user with an opportunity to provide additional input to step through the different stages in order to successfully transfer funds.

In this high level example embodiment, the transaction can include a variety of different types of transactions such as, but not limited to, account-to-account fund transfers, purchase payments, reimbursements, etc.). It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed.

Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a user 110, a user device 120, a network 130, and a host server 140. The user may include a person or an entity, or may include one more entities, for example, but not limited to, treasury, merchants, consumers, businesses, financial institutions, government institutions, etc.

In one embodiment, the user may consist of a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the user 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the user 110 may be configured to facilitate a consumer requesting to transmit electronic payments to a business (or a merchant). In this embodiment, the electronic payments may include, for example, payments at point of sale terminals, payments at ecommerce checkouts, online marketplace payments, online digital content payments, sports wagering payments, telecommunication bill payments, utilities payments, rent payments, investment payments, etc. In another embodiment, the user 110 may be configured to facilitate the transmission of electronic funds to another user. In this embodiment, the electronic funds may include, for example, crowdfunding payments, mobile wallet payments, gift payments, person-to-person payments, account-to-account transfers, etc. In another embodiment, the user 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the user 110 may be configured to facilitate a consumer requesting to transmit electronic payments to a government entity. In this embodiment, the electronic funds may include, for example, transit payments, parking payments, tax payments, permit payments, payroll payments, etc.

Figure 10:
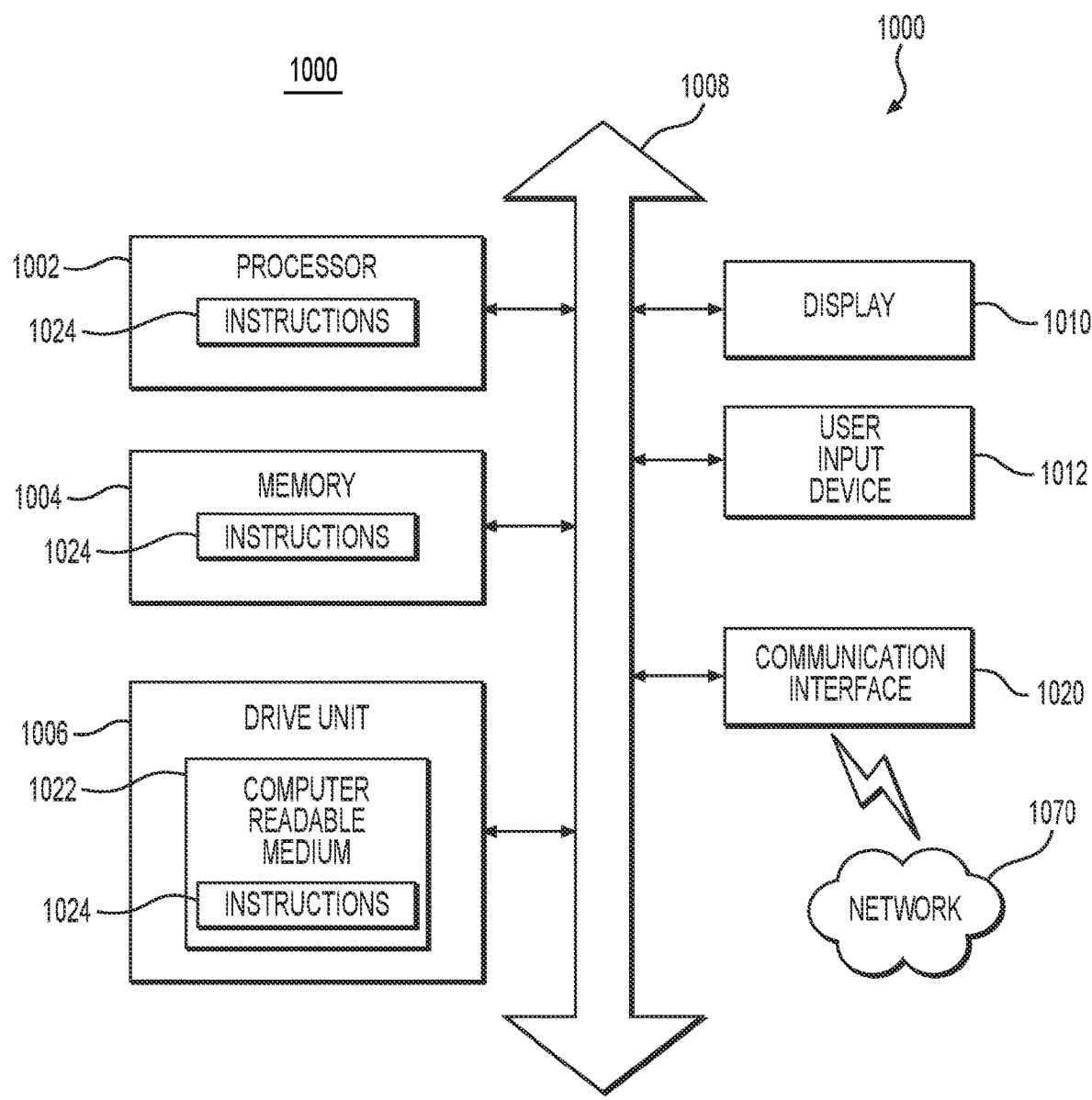
FIG. 10 illustrates a computer system for executing the techniques described herein.

The user device includes a variety of electronic computer systems including a computer, phone, tablet, or other electronic system that includes at least one processor and read/write storage device, as will be further discussed in FIG. 10. The network 130 includes any network where communication occurs directly, indirectly, and/or via a network (e.g., the Internet and/or one or more cloud networks). Additionally, the network may be a local area network (LAN), or an intranet or extranet, or any combination of networks considered. Furthermore, the network is suited to provide and/or limit accessibility to authorized users and enable the secure exchange of information and data files.

The example embodiment deals with electronic transactions, but the transactions include domestic and international fund transfers that facilitate account-to-account real-time electronic transactions (e.g., electronic payments, funds transfer, currency exchange, reimbursement, asset managements, etc.). This is done by utilizing a UI platform that communicates with the host server 140 to unify, orchestrate, and execute electronic transactions domestically and/or internationally. The types of transactions may vary in different embodiments. For example, the system may relate specifically to electronic fund transfers, currency exchange transactions, tokenization, or electronic transaction authorizations. Or, in other embodiments, the system may include Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). Furthermore, the host server 140 may be configured to operate consistently, in accordance with globally accepted security and privacy practices.

The UI Platform 180 and example embodiments disclosing sample UI will be further discussed below, but at a high level the UI platform 180 is configured to receive user input or indications, create an API call 152 and transmit the API call 152 to a host server 140. By improving the UI Platform 180 using the methods and systems outlined in the present disclosure, the user will benefit from cost reduction, improved cash flow, increased payment security, improved access to payments, and better insight and accountability of payments/funds.

The host server 140 contains the payment optimization method 150. In this example embodiment, the payment optimization method 150 utilizes the received API call 152, a security/privacy management system 154, payment optimization logic 156, machine learning/artificial intelligence (AI) 158, a transaction database 160, an account database 162, a payment option database 164, and any other system or database 170 to create an API response 184.

In an example embodiment, the security/privacy management system 154 ensure the safety and security of the system. The security/privacy management system may facilitate, for example, user access control, user throttling, and/or user identification. In one embodiment, the security/privacy management system 154 may ensure that the electronic transaction is in compliance with one or more data protection standards. Data elements of the host server 140 may be monitored in order to meet the one or more encryption standards established the security/privacy management system 154. For example, data elements, such as, personally identifiable information (PII), payment card data (PCI data), authentication credentials, other sensitive data, company confidential data, etc. may be monitored by the security/privacy management system 154.

In one embodiment, the security/privacy management system 154 may facilitate and manage the encryption of data and/or keys associated with the electronic transactions of the present disclosure. For example, the security/privacy management system 154 may include a key management service (KMS) that may establish a time-limit for the life of an encryption key. The KMS may be managed internally or externally (e.g., Amazon Web Service Key Management Service (AWS KMS)) from the host server. In one embodiment, once an encryption key exceeds its lifespan, the encryption key may be deleted from an encryption key cache in the host server. The encryption key may then be replaced with a newly generated key by the KMS. This functionality may provide compliance with a data key rotation policy that may be established by the host server, for example, by setting a cache expiration that is within the data key rotation policy limits. Further, access to the keys in the KMS may be limited by the access control of the security/privacy management system 154 and may be assigned with least-privilege.

In one embodiment, the security/privacy management system 154 may be configured to give access to users to call operations against KMS Customer Master Key (CMK) with only the designated service and/or user identities. The security /privacy management system 154 may also audit the use and access of the master keys. Further, the security/privacy management system 154 may utilize a secure hash function (e.g., Secure Hash Algorithm-256 (SHA-256)) for data elements that are encrypted, but also must be searched on. Since there may be cases where the hashed data elements (e.g., Sender name, Sender account number, Sender routing number, Receiver Name, Receiver account number, Receiver routing number, etc.) may be searched across all tenants, hashed data elements may have a global salt. In one embodiment, sensitive data elements that are at rest may be stored in the host server using Advanced Encryption Standard (AES)-256. Also, any message data in motion may be protected by enforcing a minimum of Transport Layer Security (TLS) 1.2.

The API response 184 contains packaged data and instructions that will be utilized by the UI Platform 180 to facilitate additional receiving of user input or indicia. After the API response is prepared by the payment optimization method 150, the host server transmits the API response 184 to the network 130 which is used to update the UI Platform 180. With the UI Platform 180 updated from the API response 184, the process undergoes another iteration where the user 110 provides an input through the user device 120 to take the next step to execute a real-time electronic transaction. After the user provides additional information, selections, or indicia, another API call 152 is created and transferred to the host server 140. The host server 140 performs the payment optimization method 150 and provides another API response 184 to update the UI Platform 180. The user 110 will provide another input and this iterative process continues until the electronic transaction is completed or terminated.

When the money transfer order is complete, an example embodiment additionally includes the host server transferring a reconciliation file to a reconciliation system 174. The reconciliation system 174 ensures proper recordation between transacting parties or record keeping systems and verifies the transactions to ensure consistent ledgers are stored among the various databases of multiple entities such as other parties, businesses, or government entities. Additionally, the reconciliation system 174 may receive notifications, messages, and/or acknowledgements from other related parties and may also transmit appropriate messages, alerts, and/or signals associated with the electronic transaction request to other related parties in real-time.

In another embodiment, the reconciliation system 174 utilizing block chain technology. In this example embodiment, the reconciliation file is transferred to a peer-to-peer network consisting of multiple computers or nodes. This peer-to-peer network validates the transaction using consensus algorithms and enables recordation of the transaction to a particular framework ledger. Utilizing block chain technology provides added benefits by protecting the privacy regarding transactions while at the same time enabling access to and the updating of transaction records. As an example, a verified transaction is combined with other transactions to create a new block of data for a ledger and is added to the existing block chain in a way where the data of the completed transaction is permanent and unalterable.

In another embodiment, once the electronic transfer order is completed the host server 140 produces a reporting file that is transmitted through a 3rd party reporting system 176 to all necessary and relevant 3rd parties. This allows the related 3rd parties to maintain their own records of transactions and allows those 3rd parties to utilize the information for their individual use.

Figure 2:
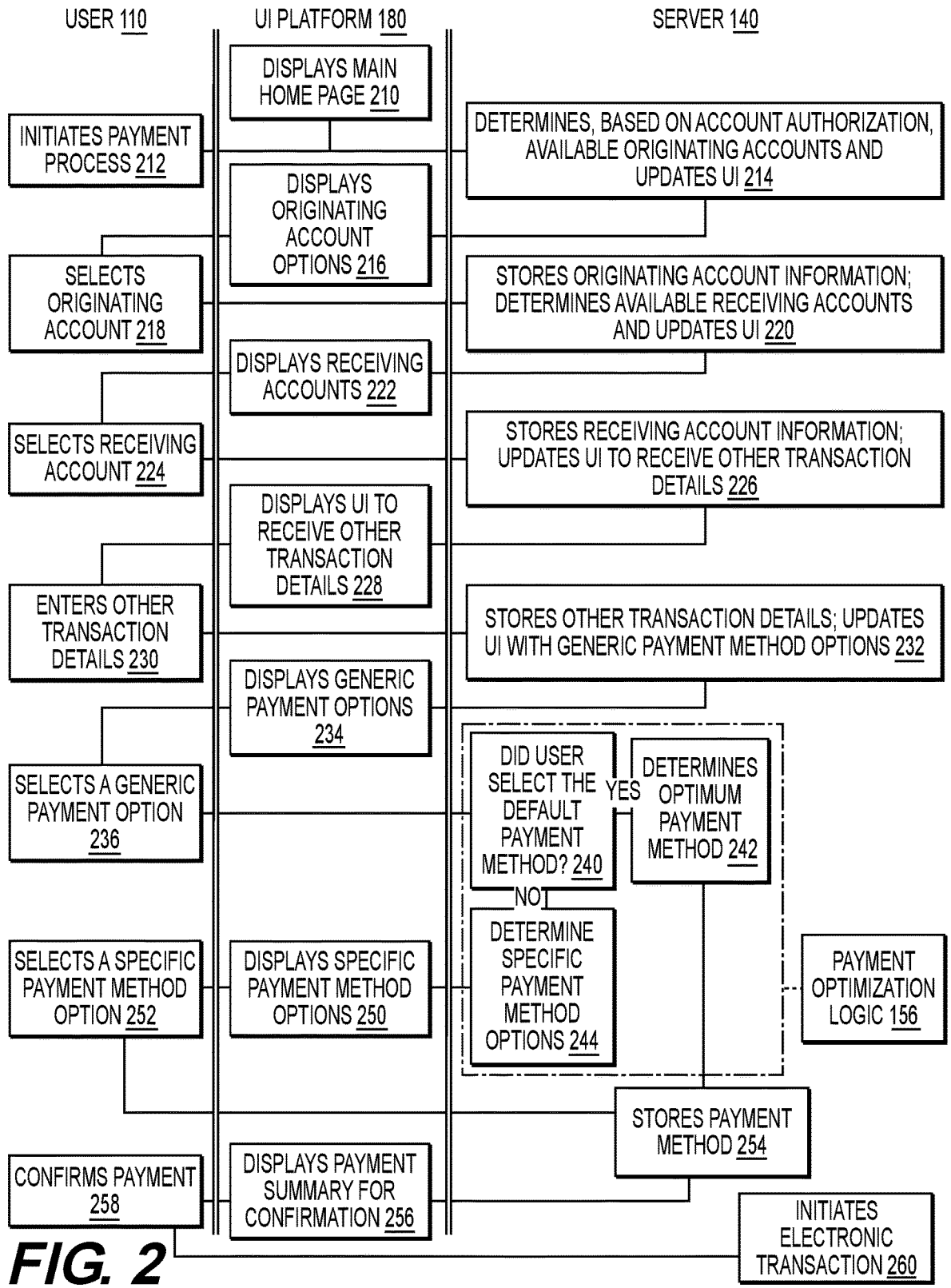
FIG. 2 depicts a block diagram of another exemplary electronic transaction system, according to one aspect of the present disclosure.

In FIG. 2, an example embodiment shows a diagram of the system interactions 200 including a step-through process showing how data, information, and instructions are transmitted between a user 110, the UI Platform 180, and the host server 140.

Initially, the UI platform 180 displays a main home page that is accessed by the user 110 using a user device 120. The user 110, in order to access the UI platform 180, will enter information through the UI platform 180 to initiate the payment process 212 by interacting with the displayed main home page 210 of the UI platform 180. The information provided by the user 110 on the UI platform 180 initially includes information required of a user 110 for verification. The verification information can include a commonly used system of a user name and a corresponding password. Alternatively, the system can utilize other authentication methods that utilize other types of information. For example, a user 110 can provide biometric data, including a fingerprint, retina or face scan, or by completing a dual authentication method or any other authentication method, or combination of methods, that are commonly known in the art.

After the UI platform 180 receives the information provided by the user 110, the information is packaged into an API call 152 and the API call 152 is transferred to the server 140. The API call 152 includes the information and indications entered using the UI platform 180 by the user 110 for verification. However, as will be discussed in other embodiments, the API call 152 can include other types of information or data obtained through the user input. Generally, the API call 152 will include information entered or indicated by the user 110 on the UI platform 180 to be used by the server 140 to determine the next set of instruction.

In the present embodiment, after the user 110 provides verification information to the UI platform 180, the information is packaged and transferred to the host server 140. The host server determines, based on the account authorization information transferred from the UI platform 180 in the API call 152, if the user 110 is an authorized user. The server 140 does this by utilizing data stored in the account database 162 and comparing the information from the account database 162 with the information found in the API call 152. If the information provided by the user 110 is able to provide verification, the server 140 determines the accounts that are available to the specific, verified user and prepares an API response 184 to update the UI with information including the available originating accounts 214 from which the electronic transaction is to be deducted from.

In this embodiment, the API response 184 is used to transfer UI updates and information to the UI platform 180 regarding the available originating accounts 216. However, as will be discussed below, the process is an iterative process. In other iterations, the API response 184 will include other types of information packaged by the server 140 and transmitted to the UI platform 180 where the UI platform 180 will read the API response 184 and update the UI platform 180 accordingly.

The API response 184 that was created by the host server 140 utilizes the payment optimization method 150 to determine the available originating accounts. In one example embodiment, these originating accounts are accounts that were set up previously by the user 110 and stored in the account database 162. In another embodiment, the payment optimization method 150 utilizes machine learning/AI 158 to enhance the user experience through training and learned algorithms by including additional instructions for updating the UI platform 180. As an example, the host server 140 may store three originating accounts (a brokerage account, a savings account and a checking account) in the account database 162 and linked to a user 110. Through machine learning/AI, the payment optimization method 150 has learned over time that based on past fund transfers this specific user 110 is likely to initiate a funds transfer from their checking account because it is the first Wednesday of the month and this particular user 110 initiates a fund transfer from that specific account 90% of the time if it is the first Wednesday of the month. Thus, when the user 110 accesses the UI platform 180 on the first Wednesday of the month, the host server 140 utilizes this learned training and information to include updates to the UI platform 180 that would improve the user experience. In this instance, the API response 184 may additionally include that the UI platform 180 is to provide the checking account first, the savings account second, and the brokerage account third so that the user 110 is not required to scroll down a dropdown menu to find the correct and desired account. Alternatively, another embodiment includes the machine learning/AI providing instructions to prefill the originating account on the UI platform 180, thus only requiring the user 110 to complete the step of selecting the appropriate originating count only if the prefilled originating account is incorrect.

In the example embodiment, the UI Platform 180 is updated, using the API response 184, to display originating accounts available for the user 110 to select. In another embodiment, the UI platform 180 may include an option to add an additional originating account if the desired originating account is not currently saved on the host server 140 in the account database162. Instead of selecting an account, the user 110 will enter the information of the new originating account and the process continues. In another embodiment, the user must add any new originating accounts prior to initiating a funds transfer. In this embodiment, only originating accounts that have been verified on the server using the security/privacy management system 154 are available to the user for transfers.

Continuing with the present embodiment, the user 110 selects the originating account 218 by choosing or providing some other kind of indicia on the UI platform 180. The UI 180 platform packages the information of the selected originating account in a data package and combines it into an API call 152 which is transferred to the host server 140.

The host server 140 retrieves this information from the API call 152 and stores the information 220 in the transaction database 160. This information can also be used by the machine learning/AI 158 to improve and further train any learned algorithms to help improve the system and user experience. Additionally, the host server 140 uses the API call 152 to determine the receiving accounts that are available to the user 110 initiating the funds transfer. Again, an opportunity to provide an improved user experience exists and can include the data optimization payment method 150 utilizing the information to suggest or arrange the possible receiving accounts in an order based on the likelihood that it will be selected by the user 110. As an example, the payment optimization method 150 can utilize the accounts database 162, transaction history database 160, and machine learning/AI 158 to determine that when a user 110 initiates a transfer from a checking account on the first of the month, the receiving account is likely to be an HOA fee paid to a business account. As a result, the data optimization method 150 provides, in the API response 184, instructions to list the HOA business account first and other potential receiving accounts in a dropdown menu. Thus, if the machine learning/AI was correct in predicting that the receiving account is the HOA business account, the user 110 will be required to provide one less input in the process which improves the user experience and reduces the overall amount of time necessary to initiate an electronic funds transfer.

The update information is packaged into a data file as an API response 184 and is transferred to the UI Platform 180 over a network where the UI platform 180 utilizes this information to display the receiving account options 216. The user selects a receiving account 224 on the UI platform 180 and the user information is packaged in a API call 152. That API call 152 is transferred to the host server 140 where the server stores the account information and determines the other transaction details 226 that are necessary and provides instructions on how to update the UI platform 180 so that the information can be received from the user 110.

Other transaction details includes variety of different types of information. Other types of required information can include, but is not limited to, amount or currency. Perhaps the user 110 desires that the electronic transaction does not actually initiate until a certain date. One example may be an instance where the user 110 is expecting a paycheck to become available on a certain date and prematurely initiating an electronic transaction will over draw the account and result in incurred fees. In this instance, the user 110 may provide other transaction details to include that the electronic transaction initiates on a certain day to provide for a buffer to ensure that the account is not overdrawn.

Or alternatively, the user 110 may provide additional other transaction details that include a certain date by which the electronic transaction is to settle. For example, the user 110 may not want to miss a payment deadline and will enter information indicated that the electronic transfer is to be completed on a certain date, which date would correspond to the due date of the payment deadline. Having the option to add this information would be beneficial to a user that wants to ensure that payments are received and settled in a timely manner.

Using machine language/AI 158 in combination with other transaction information stored in the transaction database 160, the data optimization payment method may determine what additional information should be received or what additional information would be required and include that information in the API response 184. Other variations of instructions on how to update the UI platform 180 can also be packaged in the API response and transferred over the network 130 to the UI platform 180.

Depending on the type of the other transaction details that need to be received, the UI Platform 180 displays the UI in a manner where it is able to receive other transaction details 228 entered by the user 110. The types of transaction details are determined in the data optimization payment method 150, some of which certain examples were discussed above.

The user 110 interacts with the UI platform 180 to enter the other transaction details 230 necessary to complete the initiation of the electronic transaction. The entered information is packaged in a data packet and transferred as an API call 152 to the host server to be utilized and recorded by the data optimization payment method 150. Using the information from the API call 152, the data optimization payment method 150 includes in an API response 184 instruction to display generic options for how the electronic transaction is to be carried out. This API response is transferred to the UI Platform 180 and the UI Platform 180 is updated to display generic payment options 234 from which the user is to choose. In an example embodiment, the generic options may be whether the user 110 would like to process the electronic transaction using a default payment method or whether the user 110 would like to choose from among multiple specific payment methods.

In this example embodiment, the user then selects a generic payment option 236. The selection information is packaged in a data packet and transferred as an API call 152 to the host server 140 to be utilized by the payment optimization method 150. The payment optimization logic 156 includes instructions to assist the payment optimization method with determining what is to be included in the API response 184. The payment organization logic 156 includes determining if the user 110 selected or indicated that the electronic transaction is to be completed using a default method or if the user selected to process the electronic transaction using a specific method. If the user 110 indicated a desire to process the electronic transaction using a default payment method, then the payment optimization logic determines the optimum payment method 242, stores the information in the appropriate databases such as the transaction database 160 or the account database 162, and packages the information of the determined optimum payment method 242 in the API response.

Alternatively, if the user indicates on the UI platform 180 that the user will choose the specific payment method, the API call 152 will include the information for the payment optimization logic 156 to determine the specific payment method options 244 that are available to the user 110. These specific payment method options are packaged in an API response 184 and is transferred to the UI platform 180 where the information is used to update the UI Platform 180 and display the specific payment method options 250. The user then interacts with the UI Platform 180 and selects a specific payment method option 252. This is done by selecting the specific payment method option from a drop down menu or providing indicia next to the specific payment method option of choice. This selection or indicia information is packaged in a user input data file and transferred to the host server 140 where the payment optimization method 150 stores the payment method 254 selected by the user 110 and transferred in the API call 152.

In the example embodiment, whether the user selected the option to use the default method of payment or selected a specific payment method option, the payment method and a summary of the transaction information is compiled in an API response 184 and transferred to the UI platform 180. The UI platform 180 reads the update file 184 and updates the UI to display a payment summary for confirmation 256 by the user 110. The confirmation page includes all information relative to the electronic transaction and provides an opportunity for the user 110 to review the transaction for errors. If the information looks correct, the user 110 will indicate a final approval or verification through the UI platform 180 and this verification information is transferred in the API call 152 to the host server 140 where it is read and utilized by the electronic transaction processing method 166 to process the electronic transaction 260.

Figure 3:
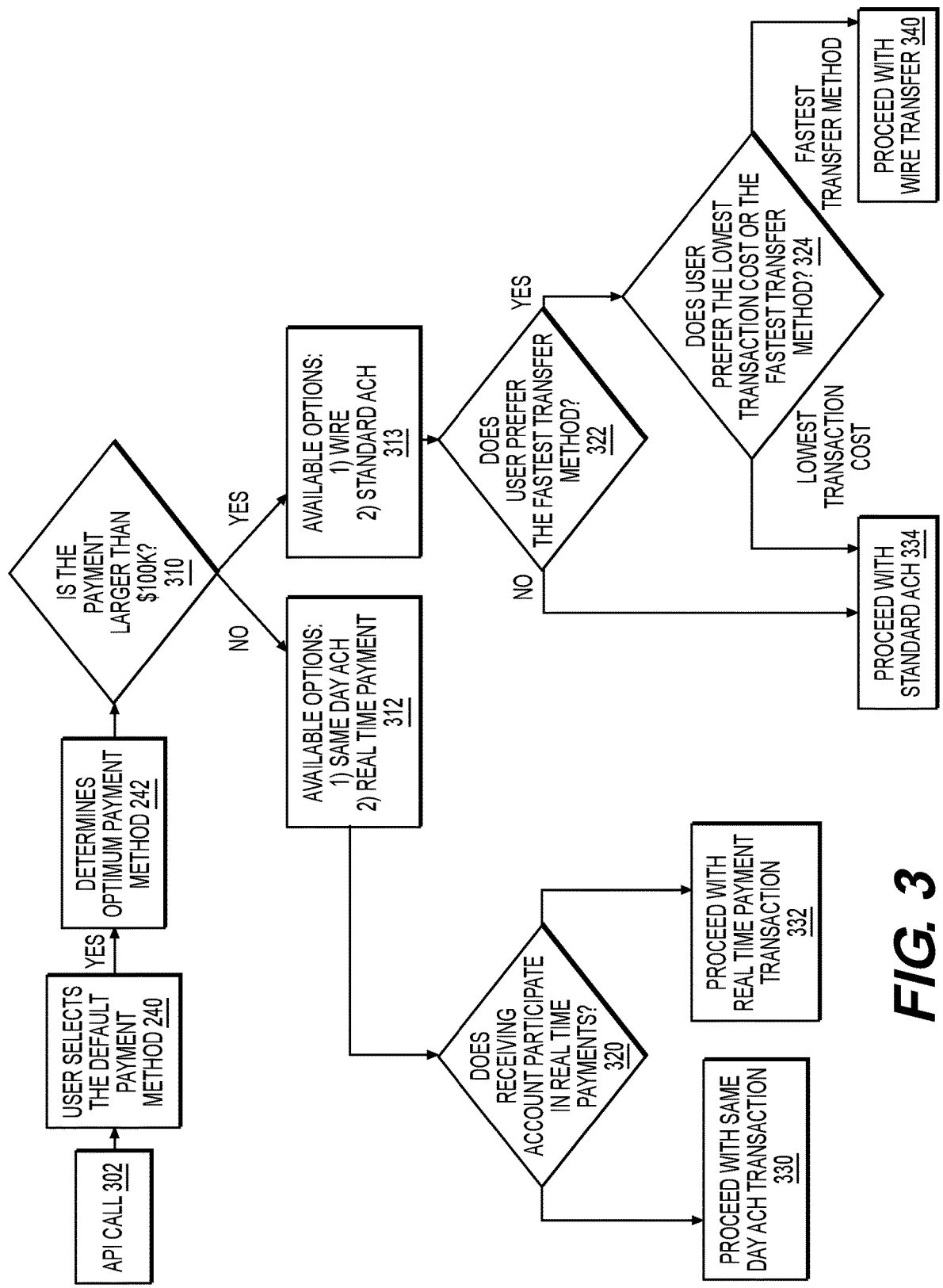
FIG. 3 depicts a block diagram of an exemplary utilization of the payment optimization logic, according to one aspect of the present disclosure.

FIG. 3 is an example block diagram that depicts another example embodiment. This example embodiment describes how the host server 140 and the payment optimization method 150 utilize the payment optimization logic 156 to determine the optimal payment method. In this example, the optimal payment method is determined when a user 110 provides input or indicia on the UI platform 180 which generate an API call 302 to select the option to initiate an electronic transaction using a default payment method 240. FIG. 3 is a breakdown of how the payment optimization logic 156 determines the optimum payment method 242 by utilizing data and information stored in relevant databases of the host server 140 such as the transaction database 160, account database 162, payment option database 164, and other related databases.

In this example embodiment, the payment optimization logic 156 determines whether the payment is $100,000 or less 310. If the payment is $100,000 or less, the payment optimization logic 156 determines that the two available options for the electronic transaction include a same day ACH or a real time payment 312. Next the payment optimization logic will determine if the receiving account participates in real time payments 320. If the receiving account does not participate in real time payments, the payment optimization logic 156 will proceed with processing the electronic transaction as a same day ACH transaction 330. If, in the alternative, the receiving account does participate in real time payments, then the payment optimization logic 156 will proceed to initiate the electronic transaction as a real time payment 332.

The preceding description described the payment optimization logic 156 when the transaction amount was determined to be $100,000 or less. If, in the alternative, the payment optimization logic 156 determines that the transaction amount is greater than $100,000, the payment optimization logic 156 determines the available options. In this example, the two options for a payment that is larger than $100,000 includes processing the electronic transaction as a wire transfer or a standard ACH transfer 313. The payment optimization logic 156 then determines if the user prefers to initiate the electronic transaction using the fastest transfer method available 322. If the user 110 does not prefer the fastest transfer method or timeliness is of little or no importance to the user 110, the payment optimization logic 156 will proceed to initiate the electronic transaction by using a standard ACH transfer 334.

Alternatively, if the user does prefer the fastest transfer method, the payment optimization logic 156 then determines if the user prefers the lowest transaction cost or the fastest transfer method 324. The user may prefer to use the fastest transfer method, but may not prefer to use the fastest transfer method if there is an additional cost. In this instance, the payment optimization logic 156 will proceed with the standard ACH transfer. Alternatively, the user may prefer the fastest transfer method despite a high cost because it is imperative that the electronic transaction be completed as soon as possible. In this instance, the payment optimization logic 156 will proceed to initiate the electronic transaction by using a wire transfer 340.

As was previously mentioned, the optimum payment method 242 utilizes the payment optimization logic 156 by utilizing data and information stored in relevant databases of the host server 140 such as the transaction database 160, account database 162, payment option database 164, and other related databases. Additionally, the inputs, algorithms, and overall decision making process described in this example embodiment is not limiting and may include other alternative inputs, algorithms, and different overall decision making processes. The use of the payment optimization logic 156 is a benefit to the user 110 as the processing and determination of the optimum payment method is not reflected in the UI platform 180 and occurs without the user 110 knowing.

Alternatively, in another embodiment, the payment optimization logic may utilize a variety of additional or other information to determine the optimum payment method. For example, with respect to geography, the following questions may be considered: 1) Is this a U.S. domestic transaction?, 2) Is this a U.K. domestic transaction?, 3) Is this cross-border?, and so on. Each option may affect or change the determined optimum payment method and influence the decision making process of the host server 140.

In another embodiment, holidays and the transaction processing time around holidays may require the payment optimization logic 156 to consider that the electronic transaction may take additional time or days to process. In order ensure that a transaction gets processed on time, the processing time must be calculated with any non-processing windows, like a weekend or a bank holiday, in consideration.

In an example embodiment, cost of the transaction was disclosed as being one factor for consideration by the payment optimization logic 156. It is known that the costs of electronic transactions varies. As such, depending on the user's preference, the transaction may be routed through the least expensive method. However, a transaction amount may exceed a particular maximum allowed threshold. In such a case, the payment optimization logic 156 may not consider that particular route option or potentially split a transaction across multiple electronic transactions.

In other embodiments the payment optimization logic 156 may utilize different rules trained or learned by the host server 140 and may be configurable, for example, at different hierarchies: global system-wide rules; rules particular to a payment method; and customized user specific rules. Additionally, the payment optimization logic 156 may take real-time feedback from a variety of systems. In another example embodiment, the payment optimization logic 156 may receive real-time feedback from a fraud monitoring system and based on a fraud profiling conducted by the fraud monitoring system, an electronic transaction by the user may be decided by the payment optimization logic to utilize a particular payment method based on the real-time feedback from the fraud monitoring system. For example, a risky electronic transaction may be directed away from a particular payment method if the payment optimization logic determines the user may risk allowable for charge-backs. In another embodiment, inputs from machine learning/AI may provide the payment optimization logic with non-real-time machine learning feedback to adjust payment methods as subtle trends are identified.

Figure 4:
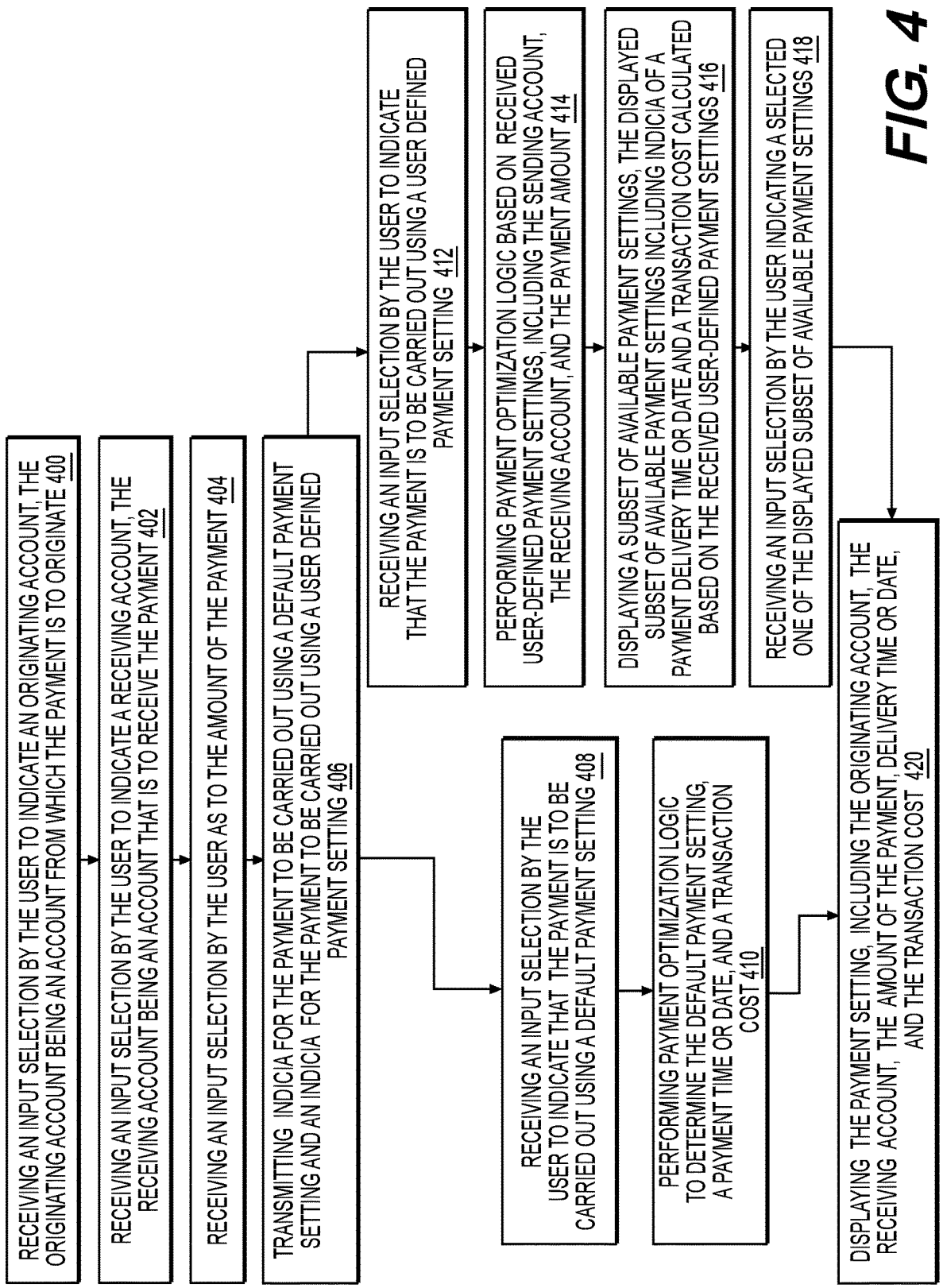
FIG. 4 depicts a block diagram of another exemplary electronic transaction system, according to one aspect of the present disclosure.

In FIG. 4, the electronic transaction process is described in a box diagram from the perspective of the host server 140. In this embodiment, the process describes receiving an input selection by a user 110 to indicate an originating account. The originating account is the account from which the payment is to originate from 400. The process also comprises receiving an input selection by the user 110 to indicate a receiving account. The receiving account is the account that is to receive the payment 402. The process also comprises receiving an input selection by the user 110 as to the amount of the payment 404. The process comprises the host server transmitting indicia for the payment to be carried out using a default payment setting and an indicia for the payment to be carried out using a user defined payment setting 406.

The process for the host server comprises receiving an input selection by the user to indicate that the payment is to be carried out using a default payment setting 408, or alternatively, receiving an input selection by the user to indicate that the payment is to be carried out using a user defined payment setting 412.

If the host server receives an input selection by the user to indicate that the payment is to be carried out using a default payment setting 408, then the process further comprises performing payment optimization logic to determine the default payment setting, a payment time or date, and a transaction cost 410 and displaying the payment setting, including the originating account, the receiving account, the amount of the payment, delivery time or date, and the transaction cost (420)

If the host server receives an input selection by the user 110 to indicate that the payment is to be carried out using a user defined payment setting 412, then the process further comprises the host server performing payment optimization logic based on received user-defined payment settings, including the sending account, the receiving account, and the payment amount 414. The process further comprises displaying a subset of available payment settings, the displayed subset of available payment settings including indicia of a payment delivery time or date and a transaction cost calculated based on the received user-defined payment settings 416. The process further comprises receiving an input selection by the user indicating a selected one of the displayed subset of available payment settings 418 and displaying the payment setting, including the originating account, the receiving account, the amount of the payment, delivery time or date, and the transaction cost (420)

Figure 5:
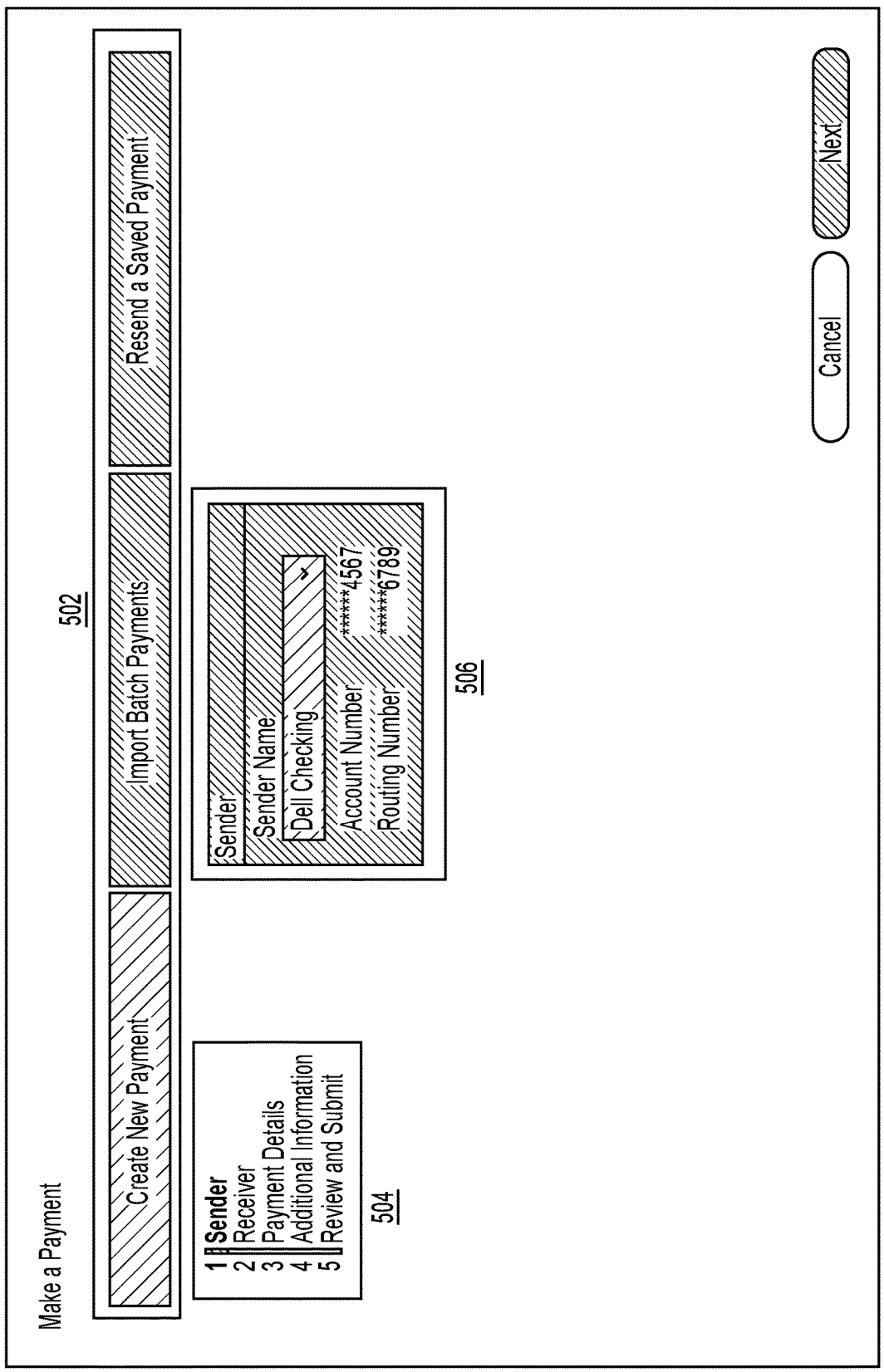
FIG. 5 illustrates an example embodiment of an exemplary UI display, according to one aspect of the present disclosure.

An example embodiment of a UI Platform 180 will be discussed in FIG. 5— FIG. 9. In FIG. 5, the navigation bar 502 includes three headings, "Create a New Payment", "Import Batch Payments", and "Resend a Saved Payment". These headings are links that will determine what is to be displayed in the process indicator box 504 and the main display box 506. In the example embodiment, the "Create a New Payment" link has been selected by a user 110 and is indicated by the highlighted box. The process indicator box 504 and the main display box 506 corresponds to the "Create a New Payment" selection. If the user instead desired to import batch payments or resend a saved payment and indicated this by selecting the appropriate box within the navigation bar 502, the process indicator box 504 and the main display box 506 would be updated with the selection. Each example embodiment also comprises a "cancel" button and a "next button". The cancel button allows the user to cancel the electronic transfer request and the next button allows the user to progress to the next step in processing an electronic transaction.

In the example embodiment of FIG. 5, the process indicator box shows steps 1-5 and step 1 is selected which reads "Sender". In the main display box 506, the box includes information about the sender including a dropdown menu of the sender name and the corresponding account number and routing number. Only a partial viewing of the account number and routing number is provided so as to provide security and privacy from potential viewers.

Although FIG. 5 is what is displayed to the user 110, it can be appreciated that this UI display relates to FIG. 2 and specifically 210 where the UI Platform 180 displays a main home page, 212 where the user 110 initiates the payment process, 214 where the server determines, based on account authorization, the available accounts and updates the UI platform, 216 where the UI platform 180 displays the originating account options (in this case "Dell Checking"), and 218 where the user 110 selects the originating account. In FIG. 5, the UI has automatically prefilled the sender name by utilizing machine learning/AI, thus eliminating the need for the user 110 to select the sender name if the machine learning/AI is correct in predicting and prefilling the sender.

Figure 6:
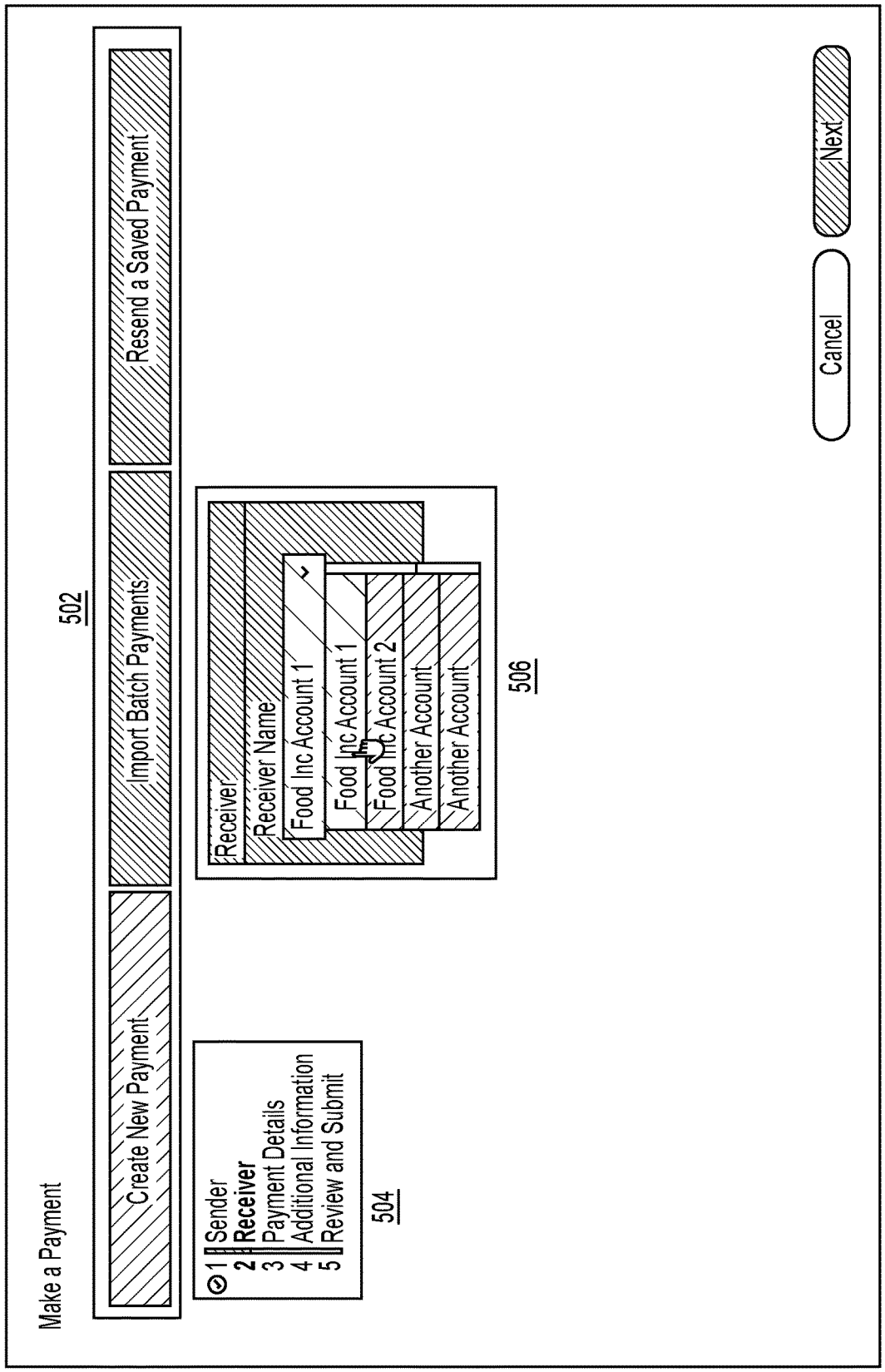
FIG. 6 illustrates an example embodiment of an exemplary UI display, according to one aspect of the present disclosure.

In the example embodiment of FIG. 6, the navigation bar 502 still has "Create a New Payment" selected indicating that the user is still in the process of creating a new payment. Additionally, the process indicator box 504 shows steps 1-5 with steps 1 and 2 indicating the progress with the shaded portion of the progress bar and the "Receiver" being highlighted displaying in the process indicator box 504 that the user is on step 2 "Receiver". Additionally, there is now a check mark next to sender indicating that the user has completed the 1st step of indicating the sender or originating account. In the main display box 506, the box now includes information about the receiver including a dropdown menu of the different receiver accounts. In this embodiment, the dropdown menu includes multiple accounts including "Food Inc Account 1", "Food Inc Account 2", "Another Account", and "Another Account". The user 110 has selected "Food Inc Account 1" by clicking the dropdown arrow and positioning the pointer over "Food Inc Account 1".

Figure 7:
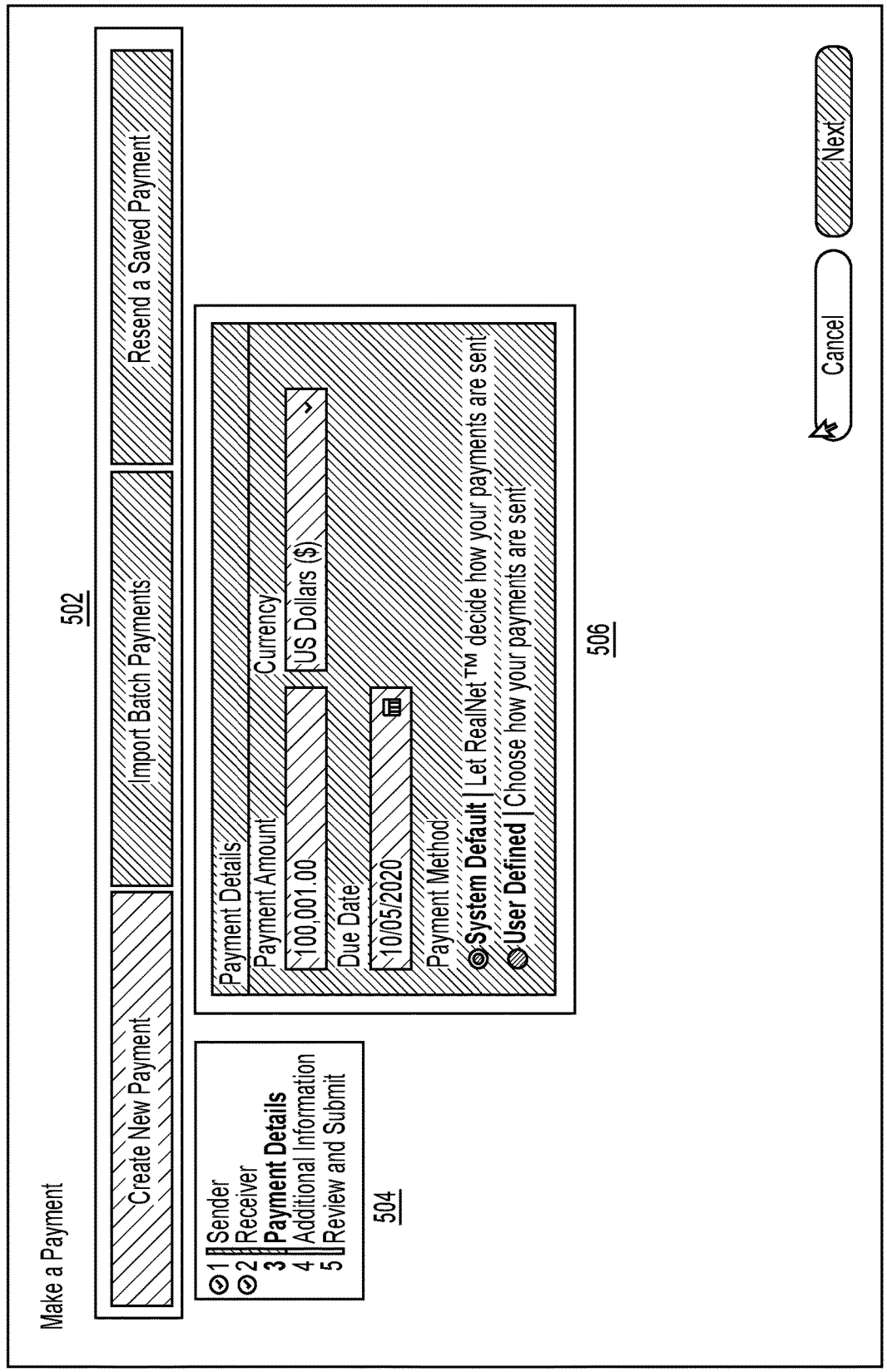
FIG. 7 illustrates an example embodiment of an exemplary UI display, according to one aspect of the present disclosure.

In the example embodiment of FIG. 7, the navigation bar 502 still has "Create a New Payment" highlighted indicating that the user 110 is still in the process of creating a new payment. Additionally, the process indicator box 504 shows steps 1-5 with steps 1 and 3 indicating the progress with the shaded portion of the progress bar. In this embodiment, "Payment Details" is not highlighted to illustrate that the UI instructions can be changed or adapted based on user preference. In the main display box 506, the box now includes information about the payment details. There is a field for the user to enter a payment amount, a dropdown menu for the user to select a currency, and a field for the user 110 to enter a due date. Additionally, the bottom of the main display box 506 includes a place for the user to select a button to provide an indication of whether the user prefers to use a system default payment method or a user defined payment method.

Figure 8:
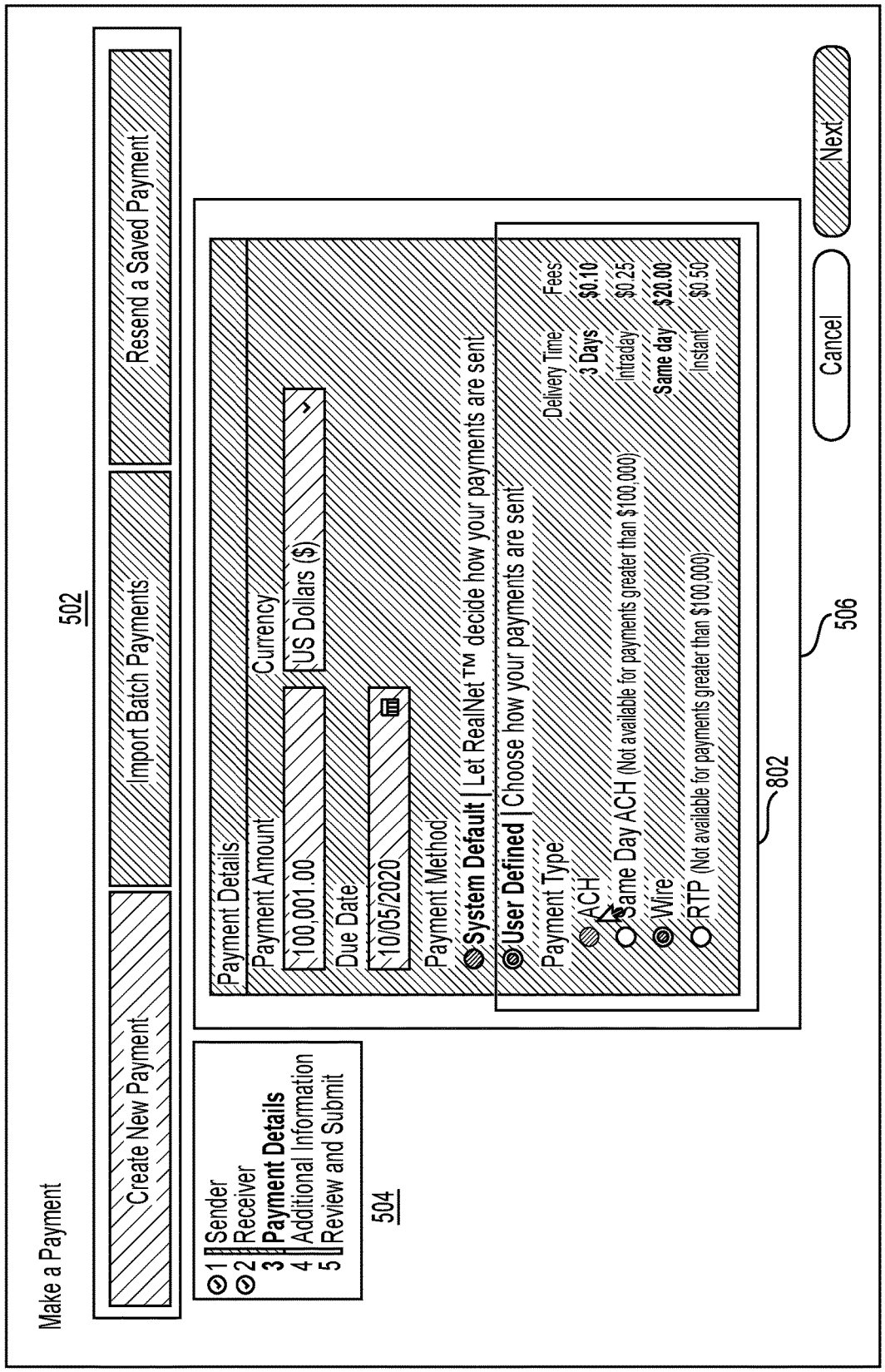
FIG. 8 illustrates an example embodiment of an exemplary UI display, according to one aspect of the present disclosure.

FIG. 8 is the next iteration of the example embodiment. In this embodiment, the user 110 has indicated a preference to use a user defined payment method as indicated by the selected dial. With the user defined payment method selected, the main display box now includes the payment options 802. In this embodiment, four payment types are displayed with a corresponding delivery time and fee. The "ACH" option is included, but the selection button is not highlighted indicating that it is not available for the electronic transaction given the user inputs of the payment amount, currency, and due date. Additionally, "Same Day ACH", "Wire", and "RTP" options are available for the user to select as indicated by the section buttons being highlighted. In this embodiment, the "Wire" option has been selected and is indicated by the "Wire" selection button being filled in green.

Figure 9:
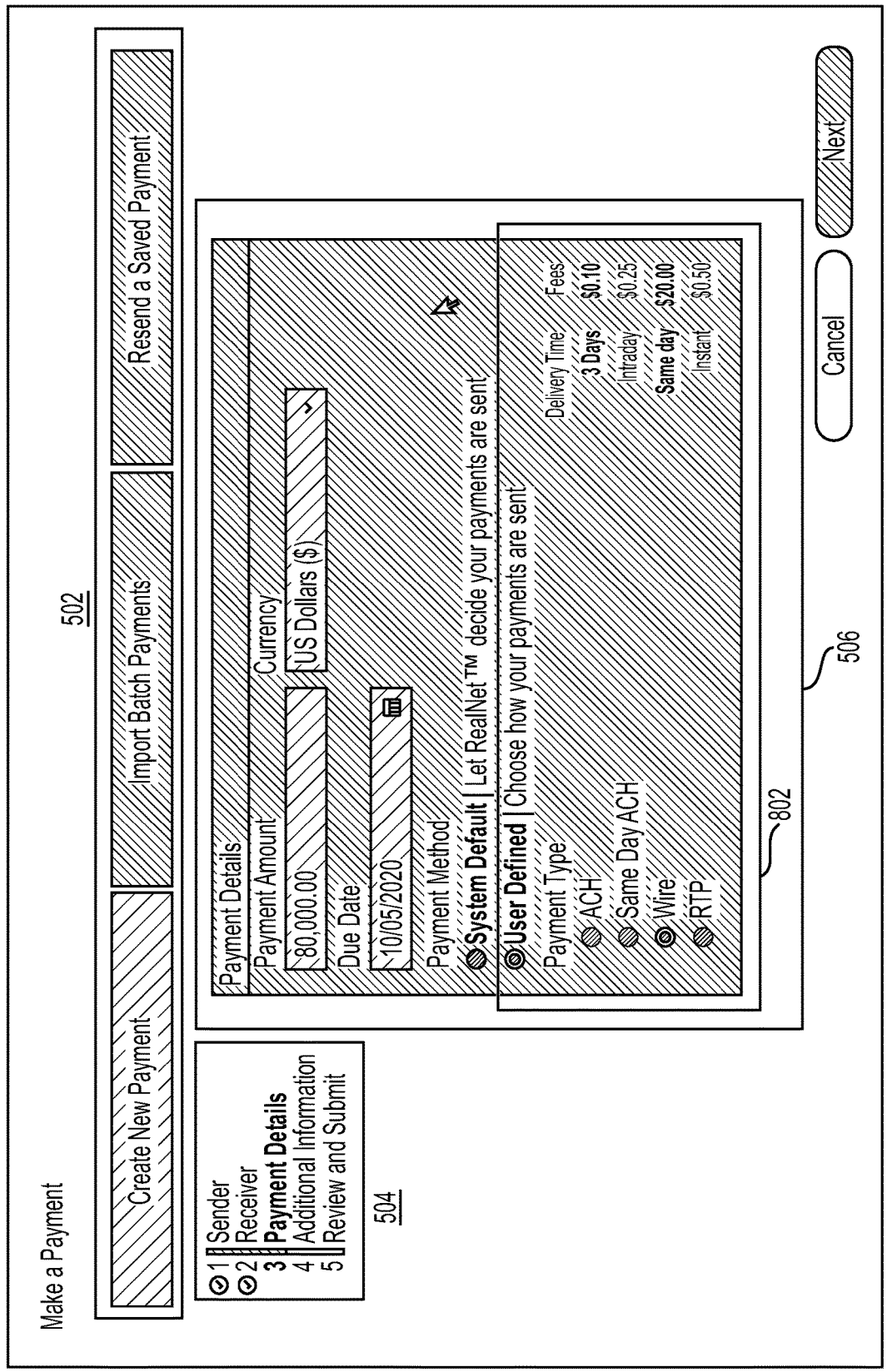
FIG. 9 illustrates an example embodiment of an exemplary UI display, according to one aspect of the present disclosure.

FIG. 9 is another example embodiment. In this embodiment, the user 110 has input the same payment details except instead, the payment amount is now $80,000. With the user defined payment method selected, the main display box includes the payment options 802. In this embodiment, however, all four payment types are displayed with a corresponding delivery time and fee. In this embodiment, the "Wire" option has been selected and is indicated by the "Wire" selection button being filled in green.

The embodiments of the UI Platform 180 are customizable and suited to improve the user experience. In one embodiment, the dropdown menus can include a variety of display features. Throughout the electronic transaction process, dropdown menus are used to receive input from the user to provide information such as the originating account, receiving account, currency, date, payment method or any other type of information. In one embodiment, the dropdown menus can be configured by the API response 184 to only include the available options. Alternatively, the API response 184 can be used to configure the UI platform 180 in a manner such that all options are displayed, but only the available options are highlighted and the unavailable options are dimmed. In another embodiment, the dropdown menu can include all options, but the descriptions of the unavailable options are crossed out. These embodiments can be applied in a variety of instances where the user needs to select or provide an indicia of a chosen option to complete the electronic transaction.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 10 illustrates a computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 1000 may further include a display unit 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control, or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g., software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1070 can communicate voice, video, audio, images, or any other data over the network 1070. Further, the instructions 1024 may be transmitted or received over the network 1070 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1070, external media, the display 1010, or any other components in system 1000, or combinations thereof. The connection with the network 1070 may be a physical connection, such as a wired Ethernet connection or may be established wirelessly as discussed below. Likewise, the additional connections with other components of the system 1000 may be physical connections or may be established wirelessly. The network 1070 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 1070. The network 1070 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1070 may include wide area networks (WAN), such as the Internet, local area networks (LAN), campus area networks, metropolitan area networks, a direct connection such as through a Universal Serial Bus (USB) port, or any other networks that may allow for data communication. The network 1070 may be configured to couple one computing device to another computing device to enable communication of data between the devices. The network 1070 may generally be enabled to employ any form of machine-readable media for communicating information from one device to another. The network 1070 may include communication methods by which information may travel between computing devices. The network 1070 may be divided into sub-networks. The sub-networks may allow access to all of the other components connected thereto or the sub-networks may restrict access between the components. The network 1070 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B, which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for a user to initiate a payment from an originating account to a receiving account, the method comprising:

training a machine learning model based on first information related to past fund transfers stored in a transaction database that indicates respective likelihoods that each originating account of a plurality of originating accounts stored in an account database will be selected by the user, and based on second information related to past fund transfers stored in the transaction database that indicates respective likelihoods that each receiving account of a plurality of receiving accounts stored in the account database will be selected by the user for a particular originating account;

determining, using the trained machine learning model, the originating account based on the first information related to past fund transfers stored in the transaction database that indicates respective likelihoods that each originating account of the plurality of originating accounts stored in the account database will be selected by the user;

prefilling, using the trained machine learning model, the originating account on a user interface based on determining the originating account;

determining, using the trained machine learning model, an order of the plurality of receiving accounts based on second information related to past fund transfers stored in the transaction database that indicates respective likelihoods that each receiving account of the plurality of receiving accounts stored in the account database will be selected by the user for a particular originating account;

displaying the plurality of receiving accounts on the user interface in the determined order;

receiving, via the user interface, an input selection by the user to indicate a receiving account from among the plurality of receiving accounts, the receiving account being an account that is to receive the payment;

updating the trained machine learning model based on the input selection by the user to indicate the receiving account;

receiving an input selection by the user as to an amount of the payment;

displaying, via the user interface, an indicia prompting the user to select for the payment to be carried out using a default payment setting or for the payment to be carried out using a user-defined payment setting;

displaying, via the user interface, available payment options associated with the user-defined payment setting, delivery times corresponding to the available payment options, and fees corresponding to the available payment options;

receiving, via the user interface, the user's input selection of the payment to be carried out, by one or the other of:

receiving an input selection by the user for the payment to be carried out using a default payment setting, and thereafter performing payment optimization logic to determine the default payment setting, a payment time or date, and a transaction cost based on one or more of geography data that identifies whether the electronic transaction is a domestic transaction or a cross-border transaction, non-processing window data that identifies an amount of time needed to process the electronic transaction, and real-time fraud data that identifies a likelihood of fraud associated with the electronic transaction; or alternatively, receiving an input selection by the user for the payment to be carried out using a user-defined payment setting, and thereafter performing payment optimization logic based on received user-defined payment settings, including the originating account, the receiving account, and the payment amount, and receiving an input selection by the user indicating a chosen payment setting; and receiving an input selection by the user indicating a selected payment option;

transmitting, to a server, an API call including information identifying the user's input selection;

receiving, from the server, an API response including indicia describing a payment method associated with the selected payment and a summary of transaction information associated with either of: the input selection of the user-defined payment setting or the input selection of the default payment setting;

transmitting and displaying, to the user interface, the indicia describing the payment method associated with the selected payment and the summary of transaction information associated with either of: the input selection of the user-defined payment setting or the input selection of the default payment setting; and displaying, via the user interface, a prompt for a user selection associated with the summary of transaction information and the payment method.

2. The method of claim 1, wherein receiving an input selection by the user to specify a receiving account comprises the user selecting the originating account and the receiving account from a dropdown menu that includes available accounts.

3. The method of claim 1, further comprising:
displaying only the payment options that would complete the payment.

4. The method of claim 1, further comprising:
displaying the payment options that would complete the payment in an order based on a number of days required to complete the payment.

5. The method of claim 1, further comprising:
displaying the payment options that would complete the payment in an order based on a cost associated with completing the payment.

6. The method of claim 1, further comprising:
indicating the payment options that are not available by dimming the payment options that would not complete the payment.

7. The method of claim 1, further comprising:
the payment options that are not available by striking through text of the payment options that would not complete the payment.

8. A real-time transaction system comprising: one or more non-transitory computer readable media storing instructions for executing a real-time electronic transaction; and one or more processors configured to execute the instructions to perform operations comprising:

training a machine learning model based on first information related to past fund transfers stored in a transaction database that indicates respective likelihoods that each originating account of a plurality of originating accounts stored in an account database will be selected by the user, and based on second information related to past fund transfers stored in the transaction database that indicates respective likelihoods that each receiving account of a plurality of receiving accounts stored in the account database will be selected by the user for a particular originating account determining, using the trained machine learning model, the originating account based on the first information related to past fund transfers stored in the transaction database that indicates respective likelihoods that each originating account of the plurality of originating accounts stored in the account database will be selected by the user;

prefilling, using the trained machine learning model, the originating account on a user interface based on determining the originating account;

determining, using the trained machine learning model, an order of the plurality of receiving accounts based on second information related to past fund transfers stored in the transaction database that indicates respective likelihoods that each receiving account of the plurality of receiving accounts stored in the account database will be selected by the user for a particular originating account;

displaying the plurality of receiving accounts on the user interface in the determined order;

receiving, via the user interface, an input selection by the user to indicate a receiving account from among the plurality of receiving accounts, the receiving account being an account that is to receive a payment;

receiving an input selection by the user as to an amount of the payment;

updating the trained machine learning model based on the input selection by the user to indicate the receiving account;

displaying, via the user interface, an indicia prompting the user to select for the payment to be carried out using a default payment setting and or for the payment to be carried out using a user defined payment setting;

displaying, via the user interface, available payment options associated with the user-defined payment setting, delivery times corresponding to the available payment options, and fees corresponding to the available payment options;

receiving, via the user interface, the user's input selection of the payment to be carried out, by one or the other of:
  receiving an input selection by the user for the payment to be carried out using a default payment setting, and thereafter performing payment optimization logic to determine the default payment setting, a payment time or date, and a transaction cost based on one or more of geography data that identifies whether the electronic transaction is a domestic transaction or a cross-border transaction, non-processing window data that identifies an amount of time needed to process the electronic transaction, and real-time fraud data that identifies a likelihood of fraud associated with the electronic transaction; or alternatively,
  receiving an input selection by the user for the payment to be carried out using a user-defined payment setting, and thereafter performing payment optimization logic based on received user-defined payment settings, including the originating account, the receiving account, and the payment amount, and receiving an input selection by the user indicating a chosen payment setting; and receiving an input selection by the user indicating a selected payment option;

transmitting, to a server, an API call including information identifying the user's input selection;

receiving, from the server, an API response including indicia describing a payment method associated with the selected payment and a summary of transaction information associated with either of: the input selection of the user-defined payment setting or the input selection of the default payment setting;

transmitting and displaying, to the user interface, the indicia describing the payment method associated with the selected payment and the summary of transaction information associated with either of: the input selection of the user-defined payment setting or the input selection of the default payment setting; and displaying, via the user interface, a prompt for a user selection associated with the summary of transaction information and the payment method.

9. The system of claim 8, wherein receiving an input selection by the user to specify a receiving account comprises the user selecting the originating account and the receiving account from a dropdown menu that includes available accounts.

10. The system of claim 8, further comprising:
displaying only the payment options that would complete the payment.

11. The system of claim 8, further comprising:
displaying the payment options that would complete the payment in an order based on a number of days required to complete the payment.

12. The system of claim 8, further comprising:
displaying the payment options that would complete the payment in an order based on a cost associated with completing the payment.

13. The system of claim 8, further comprising:
indicating the payment options that are not available by dimming the payment options that would not complete the payment.

14. A non-transitory computer-readable medium storing instructions for executing a real-time transaction, the instructions, when executed by one or more processors, causing the one or more processors to perform operations comprising:

training a machine learning model based on first information related to past fund transfers stored in a transaction database that indicates respective likelihoods that each originating account of a plurality of originating accounts stored in an account database will be selected by the user, and based on second information related to past fund transfers stored in the transaction database that indicates respective likelihoods that each receiving account of a plurality of receiving accounts stored in the account database will be selected by the user for a particular originating account;

determining, using the trained machine learning model, the originating account based on the first information related to past fund transfers stored in the transaction database that indicates respective likelihoods that each originating account of the plurality of originating accounts stored in the account database will be selected by the user;

prefilling, using the trained machine learning model, the originating account on a user interface based on determining the originating account;

determining, using the trained machine learning model, an order of the plurality of receiving accounts based on second information related to past fund transfers stored in the transaction database that indicates respective likelihoods that each receiving account of the plurality of receiving accounts stored in the account database will be selected by the user for a particular originating account;

displaying the plurality of receiving accounts on the user interface in the determined order;

receiving, via the user interface, an input selection by the user to indicate a receiving account from among the plurality of receiving accounts, the receiving account being an account that is to receive a payment;

updating the trained machine learning model based on the input selection by the user to indicate the receiving account;

receiving an input selection by the user as to an amount of the payment;
displaying, via the user interface, an indicia prompting the user to select for the payment to be carried out using a default payment setting or for the payment to be carried out using a user defined payment setting;
displaying, via the user interface, available payment options associated with the user-defined payment setting, delivery times corresponding to the available payment options, and fees corresponding to the available payment options;
receiving, via the user interface, the user's input selection of the payment to be carried out, by one or the other of:
  receiving an input selection by the user to indicate that the payment is to be carried out using a default payment setting, and thereafter performing payment optimization logic to determine the default payment setting, a payment time or date, and a transaction cost based on one or more of geography data that identifies whether the electronic transaction is a domestic transaction or a cross-border transaction, non-processing window data that identifies an amount of time needed to process the electronic transaction, and real-time fraud data that identifies a likelihood of fraud associated with the electronic transaction; or alternatively,
  receiving an input selection by the user for the payment to be carried out using a user-defined payment setting, and thereafter performing payment optimization logic based on received user-defined payment settings, including the originating account, the receiving account, and the payment amount, and receiving an input selection by the user indicating a chosen payment setting; and
receiving an input selection by the user indicating a selected payment option;
transmitting, to a server, an API call including information identifying the user's input selection;
receiving, from the server, an API response including indicia describing a payment method associated with the selected payment and a summary of transaction information associated with either of: the input selection of the user-defined payment setting or the input selection of the default payment setting;
transmitting and displaying, to the user interface, the indicia describing the payment method associated with the selected payment and the summary of transaction information associated with either of: the input selection of the user-defined payment setting or the input selection of the default payment setting; and
displaying, via the user interface, a prompt for a user selection associated with the summary of transaction information and the payment method.

15. The non-transitory computer-readable medium of claim 14, wherein receiving an input selection by the user to specify a receiving account comprises the user selecting the originating account and the receiving account from a drop-down menu that includes available accounts.

16. The non-transitory computer-readable medium of claim 14, further comprising:
displaying only the payment options that would complete the payment.

17. The non-transitory computer-readable medium of claim 14, further comprising:
displaying the payment options that would complete the payment in an order based on a number of days required to complete the payment.

18. The non-transitory computer-readable medium of claim 14, further comprising:
displaying the payment options that would complete the payment in an order based on a cost associated with completing the payment.

19. The non-transitory computer-readable medium of claim 14, further comprising:
indicating the payment options that are not available by dimming the payment options that would not complete the payment.

20. The non-transitory computer-readable medium of claim 14, further comprising:
the payment options that are not available by striking through text of the payment options that would not complete the payment.

* * * * *